United States Patent [19]

Fecik et al.

[11] Patent Number: 4,525,196
[45] Date of Patent: Jun. 25, 1985

[54] GLASS SHEET HANDLING DEVICES

[75] Inventors: Michael T. Fecik, Pittsburgh; John J. Ewing, Tarentum; Edward I. Mates, Pittsburgh, all of Pa.

[73] Assignee: PPG Industries, Inc., Pittsburgh, Pa.

[21] Appl. No.: 644,168

[22] Filed: Aug. 24, 1984

Related U.S. Application Data

[63] Continuation of Ser. No. 486,653, Apr. 20, 1983, abandoned, which is a continuation-in-part of Ser. No. 341,975, Jan. 22, 1982, abandoned.

[51] Int. Cl.$^3$ ............................................. C03B 23/02
[52] U.S. Cl. ........................................ 65/287; 65/104; 65/106; 65/107; 65/111; 65/374.1; 65/374.11; 29/132; 432/236
[58] Field of Search ............... 65/104, 106, 374.1, 65/374.11, 287, 107; 29/132; 432/121, 236, 246

[56] References Cited

U.S. PATENT DOCUMENTS

| | | | |
|---|---|---|---|
| 3,662,446 | 5/1972 | Walls | 65/374.1 |
| 3,846,106 | 11/1974 | Seymour | 65/114 |
| 3,973,943 | 8/1976 | Seymour | 65/348 |
| 4,092,141 | 5/1978 | Frank et al. | 65/114 |
| 4,139,359 | 2/1979 | Johnson et al. | 65/107 |
| 4,246,313 | 1/1981 | Stengle, Jr. | 428/266 |
| 4,277,276 | 7/1981 | Kellar et al. | 65/106 |
| 4,297,118 | 10/1981 | Kellar et al. | 65/104 |
| 4,311,509 | 1/1982 | Reader | 65/351 |
| 4,316,930 | 2/1982 | Stengle, Jr. | 65/107 |
| 4,421,482 | 12/1983 | McMaster | 65/374.1 |

Primary Examiner—Arthur Kellogg
Attorney, Agent, or Firm—Andrew C. Siminerio

[57] ABSTRACT

Glass sheet handling devices are provided with glass sheet engaging surfaces composed of a phenolic resin reinforced with fibers of an aromatic polyamide composition. In a specific embodiment of this invention, a sufficient number of said fibers extend to an exposed surface of said devices to develop a coefficient of friction sufficient to prevent relative sliding between the exposed surface of said glass sheet engaging member and said glass sheet.

6 Claims, 7 Drawing Figures

GLASS SHEET HANDLING DEVICES

RELATION TO OTHER APPLICATIONS

This is a continuation of application Ser. No. 486,653 filed Apr. 20, 1983 which is a continuation-in-part of Ser. No. 341,975 filed Jan. 22, 1982 both now abandoned.

BACKGROUND OF THE INVENTION

1. Field of the Invention

The present invention relates to devices having glass engaging surfaces of a special composition for handling hot glass sheets. One embodiment of this invention comprises a device for transferring hot glass sheets from a shaping station to a cooling station, and particularly relates to the type of transfer device that returns empty to the shaping station for transferrring a succeeding hot glass sheet to the cooling station to perform a mass production method for shaping and heat-strengthening or tempering glass sheets. Other embodiments of this invention relate to rolls having glass sheet engaging surfaces composed of a special composition used to convey glass sheets through a moderately hot atmosphere, rolls having glass sheet engaging surfaces of said special composition to shape glass sheets passing thereover while the rolls rotate to move contacted heat-softened glass sheets and transfer rolls or roll segments having glass sheet engaging surfaces of said special composition that directly contact hot glass sheets during their handling. Still another embodiment of this invention involves a glass sheet lifting member that has a glass sheet engaging surface composed of said special composition. The present invention comprises methods of handling glass sheets involving directly contacting each sheet to be handled with a glass sheet handling device having an exposed surface composed of a special material that is both durable and that does not mar hot glass surfaces on engagement at elevated temperatures experienced during such handling.

2. Technology Problems and Patents of Interest

The prior art has provided devices for transferring hot glass sheet which comprise an outline or ring-type mold of relatively rigid metal that comprises an outline upper surface shaped to conform to the shape desired for the glass sheet and to which the glass sheet sags to conform by heating the glass-laden mold until the glass sheet is sufficiently soft to sag and conform to the shape provided by the shaping surface. When the glass sheet reaches the shaping surface, it is quenched suddenly and rapidly by applying cold air blasts against the supported lower surface and against the upper exposed surface of the glass sheet.

When the sagged glass sheet contacts the hot, heavy metal rail during this rapid cooling, glass breakage can result from surface vents at the glass-metal contact areas. In the past, glass sheet tempering molds of the outline type have been reduced in thickness along their glass engaging upper edge to reduce the effect of heat transferred at the glass engaging surface of the mold. As an alternative, tempering molds of the outline type have been provided with ribbons of insulating material such as asbestos or of heat-resisting material such as a strip of fiber glass. These ribbons space the supported glass sheet from direct contact with the heavy metal of the outline mold.

In recent years, glass sheets of thinner and thinner dimensions have been shaped and strengthened by rapid cooling to impart at least a partial temper. Such glass sheets have been shaped by lifting a glass sheet from a conveyor, which may be either of the roller type or of the gas hearth type, into engagement with a flat or contoured or deformable vacuum holder in vertically spaced relation to the conveyor. A ring-like member having an outline shape conforming to that of the glass sheet receives the shaped glass sheet from the vacuum holder and transfers the sheet to a cooling station. Preferably, the prior art ring-like member comprises one or more bars of nonmetallic material having a low heat transfer coefficient that engage the glass sheet. A metal ring hugs the bar or bars to reinforce the latter in spaced relation to the glass sheet engaging surface of the bar or bars so as to minimize the effect to the reinforcing metal ring on the rate the glass portion in contact with the nonmetallic bar or bars is cooled during rapid chilling.

Prior art ring-like members of the aforesaid construction have been used in combination with several types of shaping stations. In one type, a hot, deformable glass sheet is lifted to conform to the shape of a contoured vacuum holder prior to its transfer to the ring-like member. In a second type, a hot deformable glass sheet engages a deformable vacuum holder while flat and changes shape while the deformable vacuum holder is distorted. In a third type known as drop forming, a hot glass sheet is dropped from a flat or contoured vacuum holder onto a ring-like member of contoured outline so that it assumes the shape of the ring-like member on impact therewith as the still hot glass sheet drops from the vacuum holder onto the ring-like member. The latter then also serves as a transfer device to support the glass sheet during its conveyance from any of the aforesaid types of shaping stations to a cooling station.

In the past, the best material used for the transfer device has been able to maintain its initial shape when exposed to a limited elevated temperature range only. This has necessitated limiting the proportion of the cycle time for a transfer operation when the transfer device engages a hot glass sheet for transfer from the shaping station to the cooling station to limit the maximum temperature that the transfer device attains during a repetitive transfer cycle. A considerable proportion of the cycle time involved in transferring sucessive glass sheets on a transfer device from a shaping station to a cooling station had to be wasted while the transfer device was empty for a sufficient proportion of the cycle time to enable its temperature to recover to a temperature range sufficiently cool to avoid thermal damage of the nonmetallic bar or bars that comprises the glass engaging member of the transfer device. Furthermore, it was found that materials that did not mark the surface of the glass sheets at slow production rates marked the glass surface when production rates increased. Other materials used in the past wore unevenly and relatively rapidly at the higher temperatures developed during intermittent exposure to hot glass at more rapid production rates. The latter materials, on developing higher temperatures, needed reshaping or frequent replacement in order to maintain the shape of the glass sheets within desired specifications.

Donut type rolls have been used to transfer glass sheets from a ring-like member to an unloading conveyor, and shaped conveyor rolls composed of interfitting segments loosely fitted together to assume the shape of a curved shaft have been used in glass sheet handling. Glass sheets have been shaped while hot by conveying the glass sheets from a hot atmosphere into a shaping station where one or more glass sheets are lifted on shaped molds of spaced slats having shaped upper edges. Prior to the present invention, materials used in glass engaging locations either had limited utility at elevated temperatures or were carcinogenic in nature or were thought to require a coating of a special material that serves both as a solid film lubricant or glass release agent as well as a filler throughout the body of the glass engaging member.

It would be desirable for the glass sheet treating art to discover a material that can be used at higher temperatures than the materials previously used without sustaining thermal damage. It would also be desirable if the material is capable of use in a high speed operation at elevated temperatures without marking the shaped glass sheet surface when the sheets are transferred from a tunnel-type furnace or a shaping station to a cooling station while supported on a transfer device that contacts the glass sheet directly during its transfer. It would also be desirable to employ a high temperature material that does not mar a glass sheet it engages and is also safe for personnel handling.

U.S. Pat. No. 3,973,943 to Samuel L. Seymour discloses an outline ring-like transfer device for supporting shaped glass sheets after they are shaped and during the time they are rapidly quenched, comprising a rigid outline metal rail having an outline slightly inboard that of the shaped glass sheet and a bar or a plurality of closely spaced bar members of nonmetallic material having a lower heat transfer coefficient than that of the rigid metal rail and mounted in hugging relation against the rigid metal rail in position to conform to the outline and with an upper edge portion of the bar or bar members disposed above the upper edge of the rigid metal rail in position to provide a glass sheet supporting surface in spaced relation above the upper edge of the rigid metal rail. The bar or bar members of the Seymour patent are composed of a laminated structure, such as fiber glass cloth or asbestos woven paper layers or the like bonded together with a silicone resin binder or a phenolic resin binder. A device to unload the ring-like member of the Seymour patent using rotatable transfer rolls is shown in U.S. Pat. No. 4,092,141 to Robert G. Frank and Dewitt W. Lampman.

Prior to the present invention, the material most used for the glass engaging elements of the ring-like members of the Seymour patent and of the glass engaging surfaces of the ring-like rolls of the Frank and Lampman patent were composed of a material sold under the trademark SYNTHANE G-7 by Synthane-Taylor, an Alco Standard Company. This material was rated for maximum constant operating temperatures at 460° F. Unfortunately, in order for such material to avoid marking the glass surface during its transfer, it was necessary to operate the transfer device transferring a shaped glass sheet to a cooling station in such a manner that the transfer device remained empty at least 50 percent of the cycle time for transferring a glass sheet from the shaping station to the cooling station and returning the transfer device from the cooling station back to the shaping station so that the transfer device could cool to a temperature it could withstand before it engaged the next glass sheet. This limited the maximum production rate possible.

When attempts were made to accelerate the rate of production using the transfer device of the aforesaid Seymour patent or the Frank and Lampman patent, the material engaging the glass caused the surface of the glass to become discolored. It became necessary to develop a transfer device having a glass engaging member composed of a material that did not mar the surface of the glass at the higher temperature range the glass engaging member of the transfer device developed because of the greater proportion of the cycle time in which the transfer device was in contact with the hot glass. The material also had to be sufficiently resistant to thermal damage at the higher temperature range of exposure of the transfer device developed at the higher production rate desired.

Other glass contacting elements used to handle hot glass sheets susceptible to surface damage on engagement therewith at various temperature ranges included certain conveyor rolls, transfer rolls and forming rolls which altered the shape of moving glass sheets passing thereover and a glass sheet shaping station located in the vicinity of a furnace exit.

The search for high temperature resistant compositions for engaging glass at high temperatures led to a discovery of a composite material reported in U.S. Pat. No. 4,246,313 to Edward J. Stengle, Jr. The composite material of this patent comprises a substrate of a polymeric thermoset material such as polyaramid fibers or similar high temperature resistant material having a continuous coating or layer of solid film lubricant or glass release agent which essentially comprises an organic-inorganic silicone resin having a finely divided particulate filler therein. The polymeric fibrous substrate of this patent cannot be employed alone without a suitable heat-resisting coating for long-term repeated handling of hot glass articles. However, the coated surface of the materials covered in this patent serves as a film lubricant that allows glass slippage. Consequently, the materials covered in this patent are not suitable for use in handling glass sheets for certain treatments such as shaping or applying a design to the sheets, that require the sheets to be aligned and/or oriented precisely for the particular treatment.

SUMMARY OF THE INVENTION

According to the present invention, glass sheet handling devices are constructed with glass sheet contacting elements that engage glass sheets within a given high temperature range, said elements having a glass contacting surface composed of phenolic resin reinforced with fiber composed of an aromatic polyamide composition. In one embodiment, a glass sheet handling device of ring-like configuration is provided similar to that of the Seymour patent described hereinbefore. The bar or plurality of bars of nonmetallic material of the improved transfer device of the first embodiment is composed of a phenolic resin (preferably polyphenyl formaldehyde) reinforced with a fiber of an aromatic polyamide composition (preferably KELVAR®49 polyamide sold by Du Pont) instead of the materials previously used. These fiber compositions are popularly termed aramid compositions. The change of composition has resulted in the ability of the transfer device to operate at higher than the previous maximum speeds of operation and for considerably longer periods of time without the need for reshaping or replacement and without marring the transferred glass sheets at the higher temperatures experienced as a result of faster speeds of operation.

Therefore, it has been possible to accelerate the mass production rates and also reduce the surface marking of glass sheets processed by either the so-called air form method of making shaped, tempered glass sheets such as disclosed in U.S. Pat. No. 3,846,106 to Samuel L. Seymour or a horizontal press bending operation of the type depicted in U.S. Pat. No. 4,092,141 to Robert G. Frank and DeWitt W. Lampman, or the shaping and tempering of glass sheets performed with a deformable vacuum mold which is deformed while maintaining a heat-softened glass sheet in vacuum engagement thereagainst as in U.S. Pat. Nos. 4,277,276 and 4,297,118 to John D. Kellar and Gordon F. Pereman, prior to transferring the deformed glass sheet onto a transfer device conforming to the first embodiment of the present invention.

Another feature of the present invention is an alternate embodiment that comprises a ring-like member consisting essentially of a phenolic resin reinforced with an aromatic polyamide (commonly termed aramid) fiber. The member so constructed is sufficiently rigid in its own right so that it may omit a metal reinforcing rail of the type present in the aforesaid U.S. Pat. No. 3,973,943 to Seymour in hugging relation thereto.

Still other embodiments of the present invention provide glass engaging elements constructed in shapes other than ring-like members and consisting essentially of a phenolic resin reinforced with an aromatic polyamide (commonly termed aramid) fiber. These alternative embodiments of glass engaging elements engage glass sheets in direct contact therewith over a fairly wide range of temperatures. These alternative embodiments include cylindrically shaped conveyor rolls used in the entrance end of a heating furnace where the furnace temperature ranges from room temperatures (less than 30° C.) to approximately 400° F. (205° C.) or beyond the furnace exit where the rolls intermittently engage hot glass sheets heated to the vicinity of 1200° F. (650° C.), donut type rolls clamped around rotating rods in glass sheet handling apparatus, glass sheet unloading rolls that intermittently transfer bent and tempered glass sheets from a ring-like member to an unloading conveyor according to the teachings in U.S. Pat. No. 4,092,141 to Frank and Lampman and as glass sheet engaging elements of a slotted lifting mold used in the horizontal press bending apparatus at the glass sheet shaping station of U.S. Pat. No. 4,092,141 of Frank and Lampman. The details of the unloading rolls and slotted lifting mold described in the aforesaid U.S. Pat. No. 4,092,141 are incorporated herein by reference to minimize the need for an extended description of these structural elements that are modified according to the present invention. The present invention differs from the prior art in the composition of the material used for the glass engaging element, but the construction of these embodiments and operating elements associated with these embodiments are essentially identical except for the composition of the glass sheet engaging elements.

In order to insure that the aramid composition of the glass engaging elements composed according to the present invention engage a handled glass sheet in direct engagement, every embodiment is fabricated by working a blank of aramid material, such as by abrading, grinding, polishing, milling, or sawing the material to form an exposed fibered surface that becomes a glass sheet engaging surface of the embodiment in question. Preferably, sufficient fibers extend to the surface in exposed relation therewith to impart a frictional component to the glass sheet engaging element. This frictional feature is especially important when the preferred material is used as the glass sheet engaging surface of a rotating roll of a conveyor required to maintain a glass sheet in proper orientation and alignment therewith as the glass sheet is conveyed from roll to roll along the conveyor to a treatment station. This feature is also important in a ring-like member that is used to transport a glass sheet rapidly from a shaping station to a cooling station while inhibiting relative sliding of the sheet relative to the member.

It is important that the glass engaging member of the present invention be free of any coating that serves as a release agent or parting material so as to minimize relative motion between a glass sheet and the glass sheet contacting element of any embodiment of this invention. This insures minimum slippage and improves the likelihood that the handled glass sheet is properly oriented and aligned relative to glass sheet treatment devices, particularly shaping devices. Because of this feature, a glass sheet oriented and aligned properly at a loading station at the entrance end of a treatment conveyor remains in proper orientation and alignment throughout its path of travel through several treatment stations involving several transfers between glass sheet engaging elements without requiring the use of position and/or alignment correction means.

A most desirable glass contacting material useful for the glass supporting member according to the present invention is an aramid fiber reinforced phenolic resin sold by Spalding Fiber Company, Inc., of Buffalo, N.Y., a subsidiary of Monogram Industries, Inc., under the trademark ARK-2 ®. Substituting the aramid fiber for the fiber glass layers of SYNTHANE G-7 electric board disclosed in U.S. Pat. No. 3,973,943 to Seymour provides a glass engaging element for the transfer device that is less harmful to the glass surface at elevated temperatures and also does not develop defects as a result of the higher temperatures it attains due to its shorter period of cooling during a transfer cycle.

The present invention will be better understood in the light of a description of several illustrative embodiments of the present invention which follows.

BRIEF DESCRIPTION OF THE DRAWINGS

In the drawings which form part of the description and wherein like reference numbers refer to like structural elements.

DESCRIPTION OF THE PREFERRED EMBODIMENTS

Figure 1:
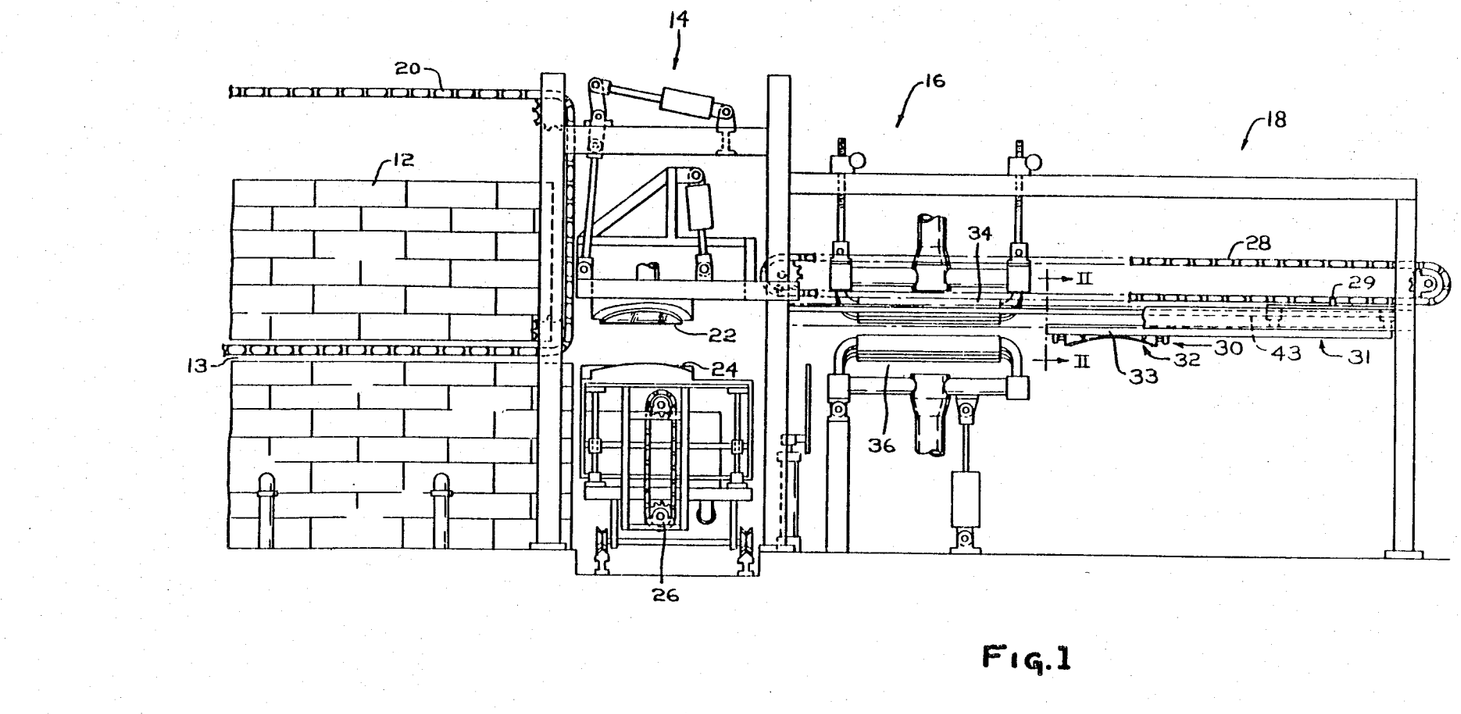
FIG. 1 is a longitudinal elevation of a typical air-form apparatus for shaping and tempering glass sheets for which the present invention has particular utility.
Figure 2:
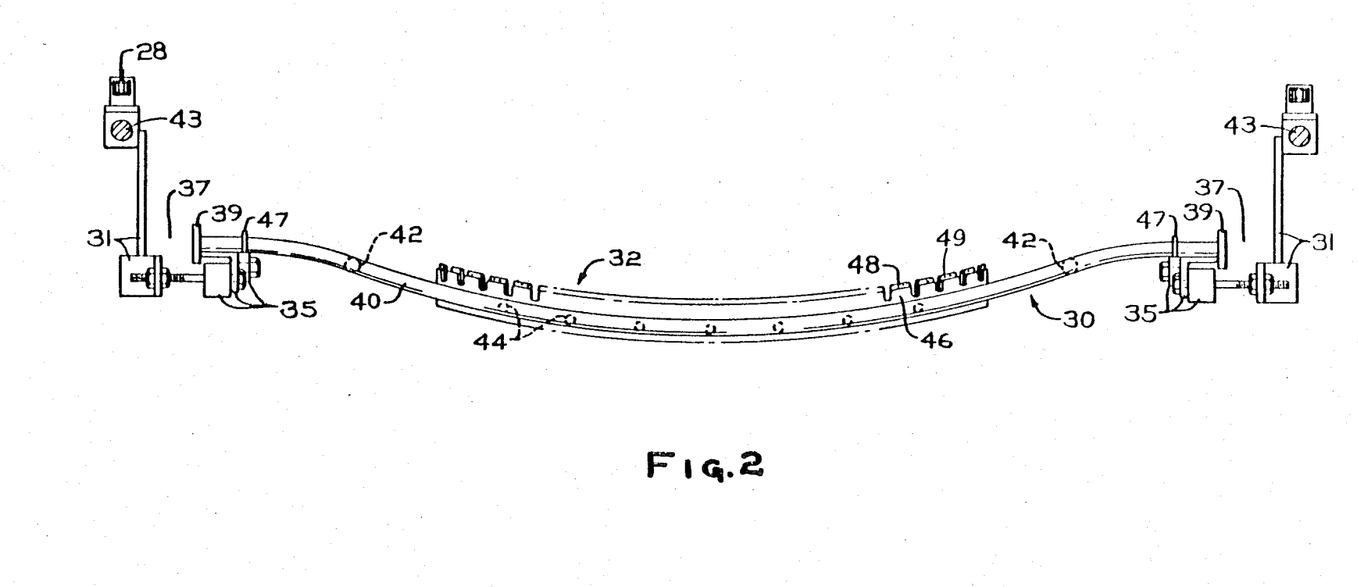
FIG. 2 is an enlarged fragmentary view taken along the lines II—II of FIG. 1.

Referring to the drawings, FIG. 1 shows a typical air form type of bending and tempering apparatus for which the present invention is especially suited. The apparatus is similar to that of U.S. Pat. No. 3,846,104 to Seymour, the disclosure of which is incorporated herein by reference. Essentially, the air form apparatus comprises a glass loading station (not shown) which is at the entrance or upstream end of a glass sheet heating furnace 12 containing a porous bed of ceramic material 13 having inlet and outlet openings dispersed therethrough in such a manner that hot gas supplied to the surface of the porous bed 13 is applied at a pressure sufficient to float a succession of glass sheets in closely spaced relation to the bed. The upper surface of the bed 13 is flat and the gas is provided at an elevated temperature sufficient to heat the glass. In addition, overhead radiant heaters of the gas or electric type may be provided to assure that glass sheets are heated to their deformation temperature during their transport through the furnace 12.

Beyond the exit end of the furnace is a glass shaping station 14. A glass cooling station 16 is located beyond the glass shaping station. A glass unloading station 18 is disposed beyond the downstream end of the glass cooling station 16. A first conveyor 20 which comprises a pair of opposing chains interconnected by cross members that engage the edge of different glass sheets conveyed through the furnace to the shaping station is used to transport the glass sheets while they are being floated on the hot gas provided through the porous bed 13 and are irradiated by the radiant heaters disposed thrughout the length of the furnace 12 in facing relation to the glass sheets.

Upon leaving the furnace 12, the glass is transferred by a transfer apparatus (not shown) such as the shuttle means 40 of U.S. Pat. No. 3,607,200 to McMaster, and arrives at a position in the glass shaping station 14 intermediate an upper vacuum holder 22 having a continuous face provided with foramina connected to a vacuum chamber and a lower ring-type mold 24 whose outline conforms to the shape of the lower surface of the upper vacuum holder 22. Lifting and lowering means 26 is provided to raise and lower the lower ring mold 24 when a glass sheet arrives in alignment between the upper vacuum holder 22 and the lower ring mold 24.

A second conveyor 28 having an upstream end near the glass shaping station 14 and a downstream end at the unloading station 18 is also provided with a pair of spaced chains similar to the chains of the first conveyor 20. The spaced chains are moved in unison to actuate movement of a pair of lugs 29 (one attached to the lower run of each chain of the second conveyor 28). Each lug 29 is connected to a carriage 31. The latter is provided with an upstream portion 33 in cantilever relation thereto. Each upstream portion 33 comprises inner structural members 35 held in spaced relation to the main portion of the upstream portion 33 to form a longitudinal groove 37 that receives a pair of washers 39. The latter are provided at the longitudinal ends of a pair of elongated curved transverse members 40, one located upstream and the other downstream. The members 40 are interconnected near their ends by cross members 42 to form an outrigger structure 30 that is in spaced relation surrounding a shaped glass sheet support member 32 of outline, elongated, ring-like structure whose upper edge conforms to the glass shape. Spaced connectors 44 interconnect the support member 32 to structure 30. The support member 32 may be either a continuous ring or a discontinuous ring-like member.

Each carriage 31 is apertured to receive a slide rail 43. A connector rod 45 interconnects the downstream ends of carriages 31. The glass sheet support member 32 is supported by the outrigger structure 30 between the upstream portions 33 of the carriages 31. Locking means in the form of a U-shaped receptacle 47 is provided in transverse alignment from carriage to carriage to receive the opposite ends of the downstream elongated curved transverse member 40.

The second conveyor 28 is actuated to move the lugs 29 and their attached carriages 31 so that the shaped glass sheet support member 32 occupies an unloading position shown in FIG. 1 or a position in alignment between the upper vacuum holder 22 and the lower ring mold 24 at the glass shaping station 14 or an intermediate position at the glass cooling station wherein the sheet support member 32 is reciprocated relative to and between an upper set of nozzles 34 and a lower set of nozzles 36 respectively, at the glass cooling station 16.

It is understood that the operation of the patented apparatus involves heating a succession of glass sheets conveyed by the first conveyor 20 through the glass sheet heating furnace 12 while floated over the porous ceramic bed 13 until the glass arrives at the position intermediate the upper vacuum holder 22 and the lower ring-type mold 24. The lifting and lowering means 26 raises the lower ring-type mold 24 to bring the glass into pressurized engagement against the upper vacuum holder 22. At this time, a vacuum is applied through the upper vacuum holder 22 to hold the shaped glass sheet against the upper vacuum holder 22 and the lower ring-type mold 24 is retracted to a position indicated in FIG. 1 to await the arrival of the next glass sheet. In the meantime, the relatively cool shaped glass sheet support member 32 is moved upstream into a position immediately below the upper vacuum holder 22, the vacuum to the upper vacuum holder 22 is stopped and the shaped glass sheet is permitted to drop onto the upper shaped surface of the shaped glass sheet support member 32.

The second conveyor 28 moves the sheet support member 32 into a position intermediate the upper set of nozzles 34 and the lower set of nozzles 36 at the glass cooling station 16. The glass is rapidly cooled at the glass cooling station by applying air under pressure through the nozzles 34 and 36 while the shaped glass sheet support member 32 is moved back and forth in a reciprocating movement within the area encompassed by the opposing nozzles 34 and 36.

When the glass is sufficiently chilled, the second conveyor 28 moves the shaped glass sheet support member 32 to the unloading station 18 where the glass sheet is removed from the support member 32. With the shaped cooled glass sheet removed therefrom, the sheet support member 32 again moves upstream toward the glass shaping station 14 to receive the next glass sheet that has been shaped by the same series of operating steps described previously. A transfer device of the type depicted in U.S. Pat. No. 4,092,141 to Robert G. Frank and DeWitt W. Lampman may be used at the unloading station.

It will be appreciated from this that the material from which the glass sheet supporting apparatus is fabricated must be sufficiently strong to withstand the dropping of a glass sheet through a short vertical distance from contact with the upper mold 22 onto the upper surface of the sheet supporting member 32. It also must be appreciated that the glass contacting element of the sheet supporting member must be one that is capable of undergoing a rapid change of temperature from the temperature of the heat-softened glass sheet that is shaped at the glass shaping station and the lower temperature to which the sheet supporting member 32 is exposed at the cooling station 16. Another important characteristic of the glass engaging means of the glass sheet supporting member 32 is that it must have a low thermal expansion and a low thermal conductivity and must be capable of being formed so that it can assume the shape of a portion of a glass sheet to be supported thereby.

A preferred glass contacting material useful for the glass support member according to the present invention is a material sold as ARK-2 ® by the Spalding Fiber Company, Inc., of Buffalo, N.Y. This material is composed of phenolic resin reinforced with aramid fiber. The glass engaging material and its relation to the rigid metal rail 32 according to one of two illustrative embodiments will be described in detail.

The phenol resin used is preferably polyphenyl formaldehyde. However, this invention is not limited to the aforesaid phenol resin.

The term "aramid" is a generic name for a class of aromatic polyamide fibers. Polyamides are high molecular weight polymers in which amide linkages (CONH) occur along the molecular chain. While natural polyamides such as casein, soybean and peanut proteins exist, the present invention involves the use of synthetic aromatic polyamides that are presently identified by the trademark KEVLAR ®, registered by E. I. DuPont de Nemours and Co., (Inc.).

KEVLAR ®, the registered trademark for one family of aramid fibers, is available in three different types:
  (1) KEVLAR 49, with a high tensile strength of 400,000 pounds per square inch (2758 Megapascals) and a high modulus of 18 million pounds per square inch (124,110 Megapascals), is designed for the reinforcement of plastics,
  (2) KEVLAR 29, with the same high tensile strength, but with a modulus of 9 million pounds per square inch (62,000 Megapascals), and
  (3) KEVLAR, with properties similar to KEVLAR 29.

For the purpose of the present invention, KEVLAR 49 has superior properties for a glass sheet support member of ring-like configuration.

The physical properties of KEVLAR 49 aramid, compared with Type E fiber glass, are shown in Table I. The tensile strength of KEVLAR 49 is about 50 percent greater than that of E-glass. Modulus, or stiffness, is almost twice that of E-glass. The fiber elongation to break is approximately 30 percent lower than that of glass.

TABLE I

| COMPARATIVE YARN PROPERTIES | | |
|---|---|---|
| | KEVLAR 49 Aramid | E-HTS Glass |
| Tensile Strength, | | |
| Pounds per square inch | 400,000* | — |
| Megapascals | (2,758) | — |
| Pounds per square inch | 525,000** | 350,000** |
| Megapascals | (3,620) | (2,413) |
| Modulus, | | |
| Pounds per square inch | 18,000,000 | 10,000,000 |
| Megapascals | (124,110) | (68,950) |
| Elongation to Break, % | 2.5 | 3.5 |
| Density, pounds per cubic inch | 0.052 | 0.092 |
| (Grams per cubic centimeter) | (1.44) | (2.55) |

*Unimpregnated twisted yarn test - ASTM D885
**Impregnated strand test - ASTM D2343

The linear stress/strain curve to failure of KEVLAR 49 filament yarn is similar to that of glass and other inorganic reinforcing fibers, but quite unlike the curves of other organic fibers. KEVLAR 49 is available in continuous filament yarns of 195 to 2130 denier (weight in grams of 9000 meters equivalent to 215 to 2370 decitex, or weight in grams per 10,000 meters). The yarns are composed of multiple, round cross-section filaments of almost 1.5 denier (1.7 decitex) per filament, (about 0.5 mil [0.013 millimeters] diameter) except for 2130 denier (2370 decitex) where the filament denier is 2.25 (2.50 decitex). Because of relative insensitivity to fiber surface defects, the tensile strength of KEVLAR 49 along the length of the fiber is uniform compared with other reinforcing fibers such as glass. The tensile strength of 400,000 pounds per square inch (2758 Megapascals) is measured per ASTM D885 using yarn twisted to 1.1 twist multiplier (10.53 TM$_{tex}$) on 10 inch (254 millimeters) gage length at 10 percent per minute elongation rate. TM$_{tex}$ = turns per centimeter times $\sqrt{tex}$ (tex being the weight per 100,000 meters of length). If, however, KEVLAR 49 is tested by the ASTM D2343 resin-impregnated strand test, commonly used by fiber glass manufacturers, the ultimate useful tensile strength is in excess of 500,000 pounds per square inch (3448 Megapascals). The combination of high tensile strength and modulus with the 0.052 pounds per cubic inch (1.44 grams per cubic centimeter) density gives KEVLAR 49 a higher specific tensile strength (Tensile Strength/Density) than any other material commercially available and a specific modulus (Modulus/Density) between that of fiber glass and high-modulus materials such as boron and graphic fibers.

KEVLAR 49 fibers also have excellent toughness, giving high damage tolerance. The latter characteristic is present over a wide temperature range.

KEVLAR 49 has good thermal stability, retaining a high percentage of room temperature properties when exposed for long periods up to 355° F. (180° C.). The fiber does not melt or support combustion but will carbonize at about 800° F. (427° C.). KEVLAR 49 also has excellent thermal dimensional stability with a slightly negative coefficient of thermal expansion of $-1.1 \times 10^{-6}$/°F. ($-2 \times 10^{-6}$/°C.) in the fiber-axis direction.

The excellent fiber properties of KEVLAR 49 are shown in reinforced plastic composites. For composite applications, the fiber is supplied without added finish or size, and because of its organic nature it can be combined with most commercially-available resins. Experience has shown, however, that the presence of moisture on the surface of the yarn can adversely affect interlaminar shear properties with some resin systems. Specifically, predrying yarn and roving of KEVLAR 49 (for example, in an air oven approximately 16 hours at 221° F.–105° C.) to less than one percent moisture is recommended.

Figure 3:
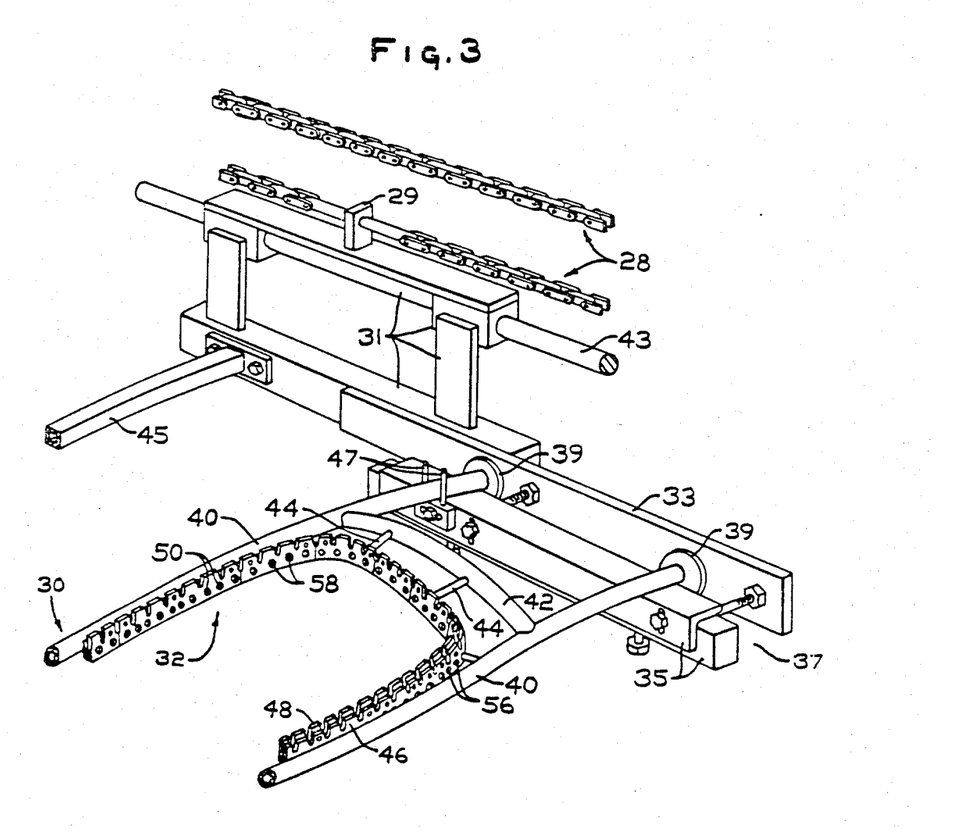
FIG. 3 is a fragmentary perspective view of a portion of apparatus for supporting shaped glass sheets during quenching forming the essential element of one embodiment of transfer device of the present invention.
Figure 4:
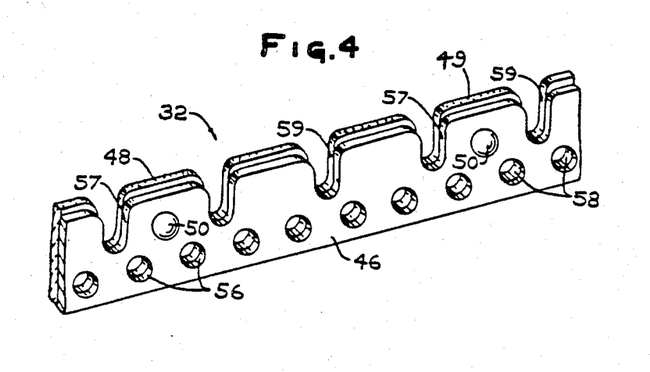
FIG. 4 is an enlargement of a portion of the transfer device of FIG. 3 showing the construction thereof.

The shape glass sheet support member 32 of the illustrated embodiment comprises an optional outline metal rail 46 that extends in the form of a closed ring-like structure to provide rigidity to the glass sheet support member and a series of nonmetallic bars or bar portions 48 formed from cutting a board of nonmetallic material such as a board of phenolic resin reinforced with aramid fibers 49 approximately three millimeters thick into short lengths, each having a desired shape conforming to the shape of a different portion of the heavy metal rail 46 except that the short lengths of bars 48 are wider than the width of the heavy metal rail 46. Each bar 48 is secured to the inner surface of the rigid metal rail 46 by nut and bolt means 50 spaced throughout the peripheral length of the reinforcing metal rail 46 and extending through aligned bolt-receiving openings in the rigid metal rail 46 and a bar portion 48. The bottom edge of the bar portions 48 are aligned with the bottom edge of the rigid metal rail 46, although this is not absolutely necessary except that in such an arrangement the full height of the metal rail is provided in side by side relation to hug the bar portions 48 and reinforce the structural rigidity of the bar portions of aramid-reinforced phenolic resin.

The fibers 49 extend to the upper edge of the nonmetallic bar or bar portions 48 in sufficient numbers to impart a coefficient of friction between said bar portions 48 and said supported glass sheet sufficient to enable said ring-like member to accelerate and decelerate rapidly and avoid sliding of said glass sheet relative to said ring-like member.

The upper edge of each bar portion 48 of aramid fiber reinforced phenolic material containing the ends of a plurality of fibers 49 is disposed above the upper edge surface of the reinforcing rigid metal rail 46 so that when glass is deposited on the shaped glass sheet support member 32, it makes contact only with the glass engaging means of aramid fiber reinforced phenolic resin provided by the bar portions 48 that are reinforced by the rigid metal rail in spaced relation below the line of glass sheet contact. The distance between the glass supporting surface of the bar portions above the upper edge of the rigid reinforcing metal rail is preferably sufficient to provide a path of heat conduction through said bar portions of sufficient length to have virtually no detrimental effects on the cooling of the glass contacting portion, while providing sufficient structural strength to support the engaged glass sheet at elevated cyclical temperature conditions with minimum harm to the glass or the bar portions.

In a typical apparatus, the reinforcing metal rail 46 is provided with apertures 56 and its upper edge has notches 57 to provide paths of escape for air blasts that are applied against the supported glass sheet in the glass cooling station 16. The bar portions 48 are similarly constructed with apertures 58 thereof, aligned with the apertures 56 in the rigid metal rail 46 and their upper edges having notches 59 deeper than the notches 57 of the rigid metal rail 46 and aligned with said notches 57. The glass engaging edges of the aramid fiber reinforced phenolic resin bar portions 48 are approximately three millimeters above the upper edge of the reinforcing metal ring 46 so that the glass sheet is supported in spaced relation to any metal and only contacts the bar portions 48 of the outline support member 32.

The upper edge of the bar portions 48 need not be serrated, particularly if the shaped glass sheets are to be annealed or heat strengthened with a relatively light temper.

Glass sheet transfer devices comprising glass sheet support members 32 of various compositions reinforced with metal rails 46 in the manner depicted in the illustrative embodiment were tested under production conditions. A transfer device having bar portions 48 of different test materials reinforced with a continuous metal rail 46 was tested preliminarily on one production line. Several of these materials failed after only a few cycles. Of the better materials tested extensively, bar portions 48 of glass fibers impregnated with silicone resin (SYNTHANE G-7) marked the glass surface portions they engaged and also distorted the engaged glass sheet portions. Bar portions 48 composed of an epoxy resin with linen reinforcement (MICARTA Type L-E supplied by Westinghouse) charred rapidly under the test conditions. Bar portions 48 composed of polysulfone thermoplastic (THERMALUX) melted and deformed under the test conditions. Bar portions 48 composed of polyester PBT thermoplastic (VALOX) deformed, melted and marked the glass under the test conditions. Bar portions 48 composed of polyether sulfone thermoplastics (VITREX) deformed, melted and mearked the glass under the test conditions. Only bar portions 48 composed of phenolic resins reinforced with aramid fibers, especially those composed of ARK-2 aramid reinforced phenolic resin blocks, did not become distorted or mark the glass under the test conditions performed.

A glass sheet transfer device having glass engaging members comprising bar portions 48 of three different types: (1) SYNTHANE G-7 grade impregnated fiber glass; (2) MICARTA Type L-E linen reinforced epoxy resin; and (3) ARK-2 grade phenolic reinforced with KEVLAR 49 fibers; connected to different portions of a metal reinforcing ring 46 was tested under production conditions at a 9.5 second production cycle. After 8000 cycles, the bar portions 48 of MICARTA Type L-E deteriorated badly and caused mark off on the engaged portion of the glass sheet, the bar portions composed of SYNTHANE G-7 marked the engaged glass sheet portions, whereas the glass sheet portions engaged by the KEVLAR 49 reinforced phenolic resin bar portions were free of surface marks or distortion and there was no measurable wear or thermal charring of the surface of the latter bar portions.

Many glass sheet transfer devices have been made for production purposes using bars or bar portions made exclusively of phenolic resin reinforced with aramid fiber. No rejects due to surface marking or distortion and no wear of the latter bars or bar portions has been observed after 25,000 parts were produced on the most frequently used of the glass sheet transfer devices made according to the present invention. In contrast, none of the other materials provided suitable results for more than 8000 cycles of operation.

The nonmetallic bar extends a short distance above a relatively heavy, high thermal capacity, metal rail in a specific embodiment in which a metal reinforcement rail hugs the nonmetallic bar throughout its length along its lower portion only. The reinforcing metal rail 46 and the nonmetallic bar 48 are disposed in side by side relationship so that only a small portion of the width of the nonmetallic bar that engages the glass sheet is not reinforced by the relatively rigid metal rail and the metal rail 46 is disposed sufficiently below the supported glass sheet to maintain the glass sufficiently spaced from the metal throughout the cooling operation so that the relatively slow cooling of the reinforcing metal of the shaped glass sheet support member does not unduly influence the rate of cooling of the glass sheet portion in alignment therewith.

In a second specific embodiment, the reinforcing rail is omitted from the glass sheet support member 32 and the rigid outline, ring-like member consists essentially of a phenol resin reinforced with aramid fibers that has a thicker bottom portion integral with a thinner upper edge portion that engages the supported glass sheet. The member may be either tapered in thickness from its upper edge portion to its bottom portion or recessed in thickness at its upper edge portion to form a relatively thick bottom portion. The bottom portion is connected to the outrigger structure 30, which is held in spaced relation from the glass sheet support member 32.

Figure 5:
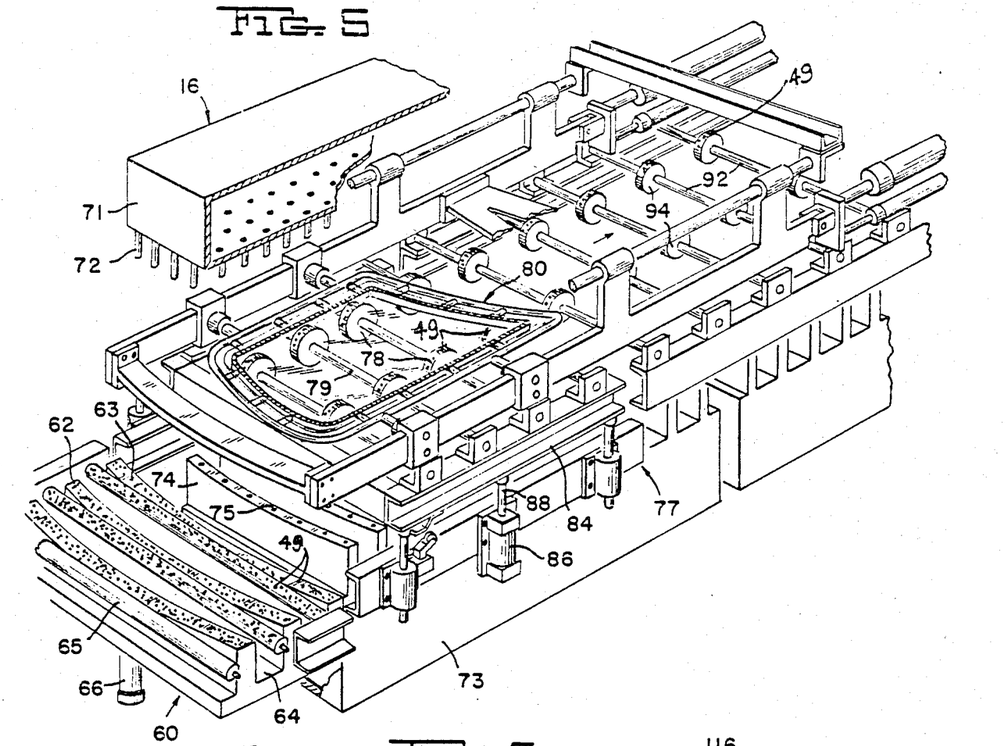
FIG. 5 is a perspective view of a portion of horizontal glass sheet bending and tempering apparatus incorporating a roll transfer device for removing glass sheets from a ring-like carrier.

In the embodiment of FIG. 5, the glass sheet shaping station 12 comprises a lower shaping mold 60 comprising spaced elongated shaping members 62 having upper edges 63 with a plurality of fibers 49 exposed at the upper edges to provide spaced portions of an upper surface conforming to the transverse shape desired for the glass sheets to be shaped. The upper surface formed by the shaping members 62 is interrupted by intermittent transversely extending grooves 64 which provide clearance for raising and lowering the lower shaping mold 60 between a recessed position below the plane of glass sheet support provided by a plurality of conveyor rolls 65 as shown in part in FIG. 5, and an upper position (not shown) above the conveyor rolls 65 in closely spaced relation to a vacuum mold (not shown) occupying a position similar to that of the vacuum holder 22 in FIG. 1.

The lower shaping mold 60 is actuated for movement by lifting and lowering means such as a piston 66 similar to the lifting and lowering means 26 of FIG. 1. The upper edge 63 of each spaced elongated shaping member 62 is composed of the preferred aramid composition of the present invention may either be integral with an elongated shaping member 62 composed of the preferred composition or may be composed of a thin, smoothly surfaced layer of said preferred composition adhered to a base of wood or other material by a high temperature adhesive such as a silicone rubber type of adhesive sold commercially under the trade name RTV-60 by General Electric.

The conveyor rolls 65 are also composed of the preferred aramid composition and have exposed surfaces with fibers 49 extending thereto. The rolls are formed by turning blank tubes slightly larger than the desired diameter of the preferred aramid type composition to form the conveyor rolls. These tubes are available from Synthane Taylor, Valley Forge, PA, under the trademark EMX-F-60.

The cooling station 16 of this embodiment comprises an upper plenum 71 provided with longitudinally spaced transverse rows of transversely spaced pipe nozzles 72 extending downwardly to direct air applied under pressure to the upper plenum toward the upper surface of a glass sheet that is aligned with the bottom openings of the nozzles. Opposing the upper plenum 71 is a lower plenum 73 provided with lower bar-type nozzle housings 74 disposed with thick walls extending vertically and having elongated openings 75 directed upward through their thickness so that air applied under pressure to the lower plenum 73 is directed upward through the elongated openings 75 against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving a ring-like member 80 along a path between said upper nozzles and said lower nozzles. The lower ends of the rows of pipes are located along a curved surface complementary to the curved shape of the upper smooth surfaces of the bar-type housing for the lower nozzles to provide a curved clearance space therebetween conforming to the transverse shape of the glass sheets conveyed therebetween. If desired, the plenums 71 and 73 may be sectionalized along the length of cooling station 16 to provide different air pressures into the various sections of the upper plenum and of the lower plenum so as to provide a program of air blasts along the length of the cooling station 16.

The upper surfaces of the lower bar-type nozzle housings 74 are smoothly surfaced and parallel to one another to provide discontinuous smooth surfaces on which glass cullet is deposited when a glass sheet fractures in the cooling station 16. The lower bar-type nozzle housings 74 may be interconnected by a pivotally mounted frame (not shown) that pivots about an axis extending longitudinally of the length of the cooling station 16, as depicted in U.S. Pat. No. 3,846,106 to Samuel L. Seymour. Frame pivoting means is provided to pivot the frame, thereby pivoting the smoothly surfaced lower bar-type nozzle housing 74 into an oblique orientation that permits the glass fragments to slide to one side of the cooling station and before the next glass sheet is processed. The means to pivot the lower bar-type nozzle housings 74 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 72 provide paths for the escape of air blasted against the upper concave surface of glass sheets treated by the apparatus described in this specification. The spaces between adjacent lower bar-type nozzle housings 74 provide paths for the escape of air blasted against the lower convex surface of said glass sheets.

Sheet transfer means 77 at the cooling station 16 includes a vertically movable conveyor section comprising a set of donut rolls 78 composed of the desired phenolic resin material reinforced with aramid fibers 49 that extend to the glass sheet engaging surface of the rolls 78. The latter have a relatively large diameter and are mounted on the central portions of the shafts 79 for rotation therewith. The shafts 79 are driven from a gear box and a motor (not shown) mounted on the upstream end portion of a frame 84. Elevator means 86 in the form of one or more pistons is rigidly supported (each with a piston rod 88) to provide vertical movement for said frame. When piston rods 88 are extended, the set of donut rolls 78 is lifted in unison in a vertical direction into positions where their common upper tangential plane lies in a horizontal plane above the uppermost portion of the shaping surface of the ring-like member 80 to transfer a glass sheet therefrom.

The cooling station 16 also comprises a downstream conveyor comprising additional conveyor shafts 92 downstream of the sheet transfer means 77. Each additional conveyor shaft 92 is provided with a pair of additionl donut rolls 94 fixed thereto for rotation therewith. The shafts 92 are longitudinally spaced from one another along the length of the downstream conveyor and the additional donut rolls 94 are rigidly supported with the common upper tangent occupying a horizontal plane slightly above the uppermost surface of ring-like member 80.

The surfaces of the glass engaging elements according to the present invention all have the desired composition in every embodiment thereof, including the lower shaping mold 60, the conveyor rolls 65, the donut rolls 78 and the additional donut rolls 4 of this embodiment. The surfaces are provided with aramid fibers 49 extending thereto by removing any coating therefrom to insure a frictional glass sheet engaging surface on these elements. Removal is usually accomplished by abrading a coating that is usually supplied by the supplier to expose aramid fibers 49 at the surface destined to contact the glass sheet handled.

Figure 6:
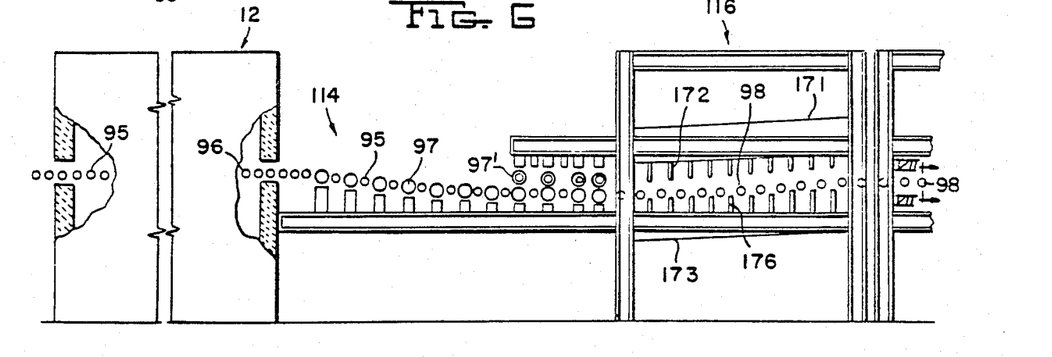
FIG. 6 is a longitudinal side view of roll forming apparatus comprising a tunnel-like furnace having a roller hearth conveyor and additional rolls beyond the furnace composed of material conforming to the present invention that directly engages glass sheets conveyed thereover at limited temperatures within a relatively wide temperature range.
Figure 7:
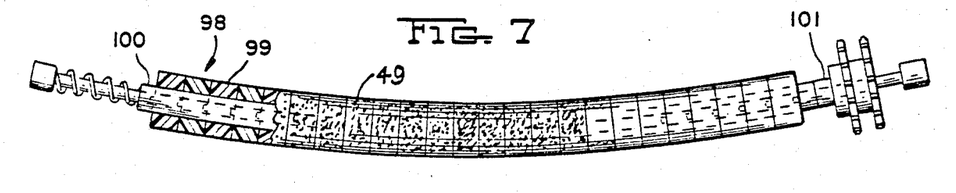
FIG. 7 is a side elevation of a segmented conveyor roll for conveying curved glass sheets taken along the line VII—VII of FIG. 6.

In the embodiment of FIG. 6, certain conveyor rolls 95 in the upstream end of a tunnel-like furnace 12 where the atmospheric temperature does not exceed 400° F. (200° C.) may be provided with glass engaging surfaces containing fibers 49 of the desired aramid composition described previously. The conveyor rolls 96 in the hotter part of the furnace 12 are composed of fused silica or other more expensive materials well known for their acceptable properties to handle glass sheets in higher temperature environments. Beyond the furnace exit, in a roll forming station 114 of the type depicted in U.S. Pat. No. 4,139,359 to Randall S. Johnson, cylindrical rolls 95 and forming rolls 97 of transversely concavely curved configuration and upper rolls 97' of complementary transversely convexly curved configuration have surfaces of the desired aramid material that are adapted to engage directly the treated glass sheets by rotation. Additional shaped conveyor rolls 98 in a cooling station 116 of the segmented type depicted in U.S. Pat. No. 4,311,509 to William D. Reader and Terry L. Wolfe, the detailed disclosure of which segmented rolls is incorporated herein by reference, are provided with glass sheet engaging collars 99 of the desired aramid material that fit snugly around hubs 100 and that include aramid fibers 49 that extent to the glass sheet engaging surface. The hubs 100 are interconnected by loose fitting tongue in groove connections to enable a torque transmitted to an endmost hub 101 to enable the hubs 100 and their snugly fitting collars 99 to rotate in unison. The rolls 98 extend transversely of the cooling station 16 between an upper plenum 17 that feeds cold tempering medium to rows of downwardly directed nozzles 172 and a lower plenum 173 that feeds cold tempering medium to rows of upwardly directed nozzles 176. The additional rolls 98 are located in positions intermediate certain rows of lower tempering nozzles 176, which is below corresponding spaced between upper corresponding rows of tempering nozzles 173.

The foregoing description represents a description of several preferred embodiments of the present invention. It is understood that various changes may be made without departing from the gist of the invention as defined in the claimed subject matter that follows. Suffice it to say that the gist of the present invention comprises a glass sheet handling device comprising a relatively rigid member that is composed of a special material that directly engages the glass sheet during its treatment in an atmosphere at a temperature range that may extent from below normal room temperature to an elevated constant temperature as high as 400° F. (200° C.) or to intermittent direct engagements with glass sheets heated to approximately 1200° F. (650° C.).

We claim:

1. Apparatus for handling a hot glass sheet during conveyance comprising a ring-like support member having a surface adapted to engage a heat-softened glass sheet and further having a relatively thin upper edge portion and a relatively thick lower portion, said surface consisting essentially of a phenolic resin reinforced with fibers composed of an aromatic polyamide composition, and means to support said ring-like member in an essentially horizontal orientation with the width of said ring extending essentially vertically to place an upper edge of said ring-like member in position to receive said hot glass sheet.

2. Apparatus as in claim 1 wherein said ring-like support member is tapered in thickness.

3. Apparatus as in claim 1 wherein said ring-like support member has an upper edge portion recessed in thickness.

4. Appratus as in claim 1 wherein said ring-like support member has an elevational shape conforming to the shape of said glass sheet.

5. Apparatus as in claim 2 wherein said ring-like support member has an elevational shape conforming to the shape of said glass sheet.

6. Apparatus as in claim 3 wherein said ring-like support member has an elevational shape conforming to the shape of said glass sheet.

* * * * *